United States Patent [19]

Chu et al.

[11] 4,181,772

[45] Jan. 1, 1980

[54] ADHESIVE GENERATOR OVERCOATED PHOTORECEPTORS

[75] Inventors: Joseph Y. C. Chu, Fairport; Richard L. Schank, Webster; Simpei Tutihasi, Pittsford, all of N.Y.

[73] Assignee: Xerox Corporation, Stamford, Conn.

[21] Appl. No.: 969,041

[22] Filed: Dec. 13, 1978

[51] Int. Cl.[2] .......................... G03G 5/04; B32B 5/16

[52] U.S. Cl. .................................... 430/58; 427/387; 428/323; 428/447; 428/913; 428/480; 428/411; 428/352; 428/328; 430/66

[58] Field of Search ............... 428/447, 323, 913, 480, 428/328, 352, 408, 411; 427/387; 96/1 PC, 1.5 N

[56] References Cited

U.S. PATENT DOCUMENTS

| | | | |
|---|---|---|---|
| 2,999,845 | 9/1961 | Goldberg | 428/447 |
| 3,041,167 | 6/1962 | Blakney | 96/1.5 N |
| 3,640,710 | 2/1972 | Mammino | 96/1.5 N |
| 4,053,311 | 10/1977 | Limburg | 96/1.5 N |
| 4,071,363 | 1/1978 | Jones | 96/1.5 R |
| 4,123,269 | 10/1978 | Von Hoene | 96/1 PC |

*Primary Examiner*—Ellis P. Robinson
*Attorney, Agent, or Firm*—A. A. Mahassel; E. O. Palazzo

[57] ABSTRACT

Disclosed is an adhesive generating layer for use in an overcoated photoreceptor system, this layer containing a generating pigment dispersed in a copolymer of a siloxane and a dihydroxy compound of the formula:

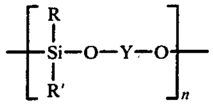

wherein R and R′ are independently selected from the group consisting of alkyl, substituted alkyl, alkenes, substituted alkenes, aryl and substituted aryl; Y is a dihydroxy radical; and n is a number of sufficient value that the average molecular weight of the resulting silicone copolymer is between about 2,000 and 250,000. Examples of copolymers include those wherein R and R′ are alkyl groups such as methyl and Y is a biphenol such as 2,2-bis-(4-hydroxy phenyl)-propane, one preferred material being a methyl octyl siloxane 2,2-bis-(4-hydroxy phenyl)-propane copolymer. Examples of pigments that are dispersed in the generating layer include metal free phthalocyanines, such as X phthalocyanine, alpha phthalocyanine, beta phthalocyanine, metal phthalocyanines such as vanadyl phthalocyanine, selenium, selenium containing compounds such as selenium alloys including selenium arsenic, selenium bismith, and other types of selenium compounds such as trigonal selenium. This adhesive generating layer is useful in an overcoated photoreceptor containing for example an electrically conductive substrate, overcoated with a layer of material capable of injecting holes into a layer on its surface, a hole transport layer in operative contact with the layer of hole injecting material, overcoated by a layer of the charge generating adhesive material on and in operative contact with the charge transport layer and a layer of an insulating organic resin overlaying the charge generating layer.

19 Claims, No Drawings

ADHESIVE GENERATOR OVERCOATED PHOTORECEPTORS

BACKGROUND OF THE INVENTION

This invention is generally directed to an electrophotographic imaging device and more specifically a generating layer for use in overcoated photoreceptors, which generator acts as an adhesive and is capable of generating charges when a pigment is dispersed therein.

The formation and development of images on imaging surfaces of photoconductive materials by electrostatic means is well known, one of the most widely used processes being xerography which is described in U.S. Pat. No. 2,297,691. Many types of photoconductors have been developed over the years for use in such imaging methods, these photoconductors including well known organic materials, inorganic materials and mixtures thereof. Recently there has been developed overcoated photoreceptor materials which comprise a series of layered compositions which photoreceptors can be used in electrophotographic imaging systems to obtain higher quality images with the overcoating acting as a protection for the photoreceptor. The details of this type overcoated photoreceptor are fully disclosed in copending application U.S. Ser. No. 881,262, filed Feb. 24, 1978 on Electrophotographic Imaging Method, S. Tutihasi, and U.S. Ser. No. 905,250, filed May 12, 1978 on Dielectric Overcoated Photoresponse and Imaging Member and Imaging Method, J. Y. C. Chu, S. Tutihasi, the specification, working examples and drawings of these applications being totally incorporated herein by reference.

While these types of photoreceptors have many advantages, there continues to be a need for a more simplified type of organic photoreceptor which can be more easily prepared and which has greater mechanical stability. Also in the photoreceptors described in the copending applications identified above where the overcoating layer constitutes a preformed mechanically tough film, it may be necessary to provide sufficient adhesive material in order to provide an integral structure which can be useful in a repetitive imaging method. It would be desirable to eliminate the need for a separate adhesive layer as this would simplify the manufacture of an overcoated photoreceptor and would additionally improve the mechanical stability of such a photoreceptor. Further if such a layer can also be made to function as a generating material while at the same time being compatible with other materials used in the system, there would be provided an improved overcoated photoreceptor which could be used over long periods of time without materially adversely affecting the quality of the image produced with such a photoreceptor. Thus, for example, should there be insufficient adhesion of the generating layer to the transport layer beneath it and the overcoating layer above it, separation and peeling can occur which will result in low quality images over a period of time when using a photoreceptor containing such layers.

Overcoated photoreceptor devices such as described in U.S. Pat. No. 3,041,167 and in the copending applications mentioned hereinbefore, as well as the improved photoreceptor of the present invention, which will be discussed in detail hereinafter, can be used in a number of imaging systems. In one preferred method of operation as described in the copending applications mentioned above the photoconductor member is charged a first time with electrostatic charges of negative charge polarity, subsequently charged a second time with electrostatic charges of a positive polarity for the purpose of substantially neutralizing the charges residing on the electrically insulating surface of the member, and subsequently exposing the member to an imagewise pattern of activating electromagnetic radiation thereby forming an electrostatic latent image. The image can then be developed to form a visible image which is transferred to a receiving member. The photoreceptor imaging member used may be subsequently reused to form additional reproductions after the erase and cleaning steps are accomplished. Other imaging methods in which overcoated photoreceptors can be used are described by Mark in an article appearing in Photographic Science and Engineering, Volumne 18, No. 3, Pages 254–261, May/June 1974.

SUMMARY OF THE INVENTION

It is therefore an object of this invention to provide a combination adhesive generator layer which overcomes the above noted disadvantages.

It is another object of this invention to provide an improved overcoated photoreceptor device which contains as part of the generator layer an adhesive that allows this layer to be substantially permanently adhered to a transport layer below it, and an overcoating layer above the generating layer.

Yet another object of this invention is the provision of an improved overcoated photoreceptor device which contains one layer which functions as both a generating layer and as an adhesive material.

A further object of the present invention is to provide an adhesive generating layer which is compatible with the other molecules used in the system which overcoated photoreceptor can be employed as an imaging member in an imaging system for prolonged period of time.

A further specific object of the present invention is the provision of a generating layer which as part of an overcoated photoreceptor layer, is inexpensive, easy to prepare and is permanently attached to the transport layer and an overcoating layer and which does not peel off after continuous use and therefore can be reused.

These and other objects of the present invention are accomplished by providing an adhesive generating layer which contains an adhesive silicone polymer having dispersed therein pigments which will function as generating materials. This generator layer functions as an adhesive thereby eliminating the need for an additional adhesive layer or layers and also allows excellent generation as more fully described hereinafter.

The siloxy linked copolymer compositions, hereinafter referred to as the silicone copolymer, used in the generating layer can generally be described as being a copolymer of a siloxane and a dihydroxy compound such copolymer being of the following formula:

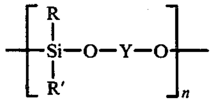

wherein R and R' are independently selected from the group consisting of alkyl, substituted alkyl, alkenes, substituted alkenes, aryl and substituted aryl; Y is a dihydroxy radical; and n is a number of sufficient value that the average molecular weight of the resulting silicone copolymer is between about 2,000 and 250,000.

Examples of alkyl radicals include but are not limited to alkanes containing from about 1 to about 20 carbon atoms, such as methyl, ethyl, propyl, butyl, isobutyl, n-butyl, pentyl, isopentyl, hexyl, heptyl, octyl, decyl, pentadecyl, eicosyl, and the like; while examples of alkenes include but are not limited to those containing from 2 to about 24 carbon atoms, such as ethylene, propylene, butylene, pentylene, hexylene, heptylene, octylene, decylene, pentadecylene, eicosylene, and the like. The aryl radicals include but are not limited to those containing from about 6 to about 20 carbon atoms, such as phenyl, naphthyl, anthryl, and the like. These radicals can contain various different numerous substituents including but not limited to halo, such as chloride, bromide, iodide, iodide, alkyl, alkenes as defined hereinbefore, and the like.

Illustrative dihydroxy materials include but are not limited to those radicals containing at least two hydroxyl groups, such as ethylene glycol, butylene glycol, propylene glycol, isopropylene glycol, trimethylene glycol, 1,3-butane diol, pentamethylene glycol, hexamethylene glycol glycerol, biphenols and the like. Examples of biphenols include 2,2-bis-(4-hydroxy phenyl)-propane (bisphenol A), 2,4'-dihydroxydiphenyl-methane; bis-(2-hydroxylphenyl)-methane; bis-(4-hydroxyphenyl)-methane; bis-(4-hydroxy-5-nitro-phenyl)-methane; bis-(4-hydroxy-2,6-dimethyl-3-methoxyphenyl)-methane; 1,1-bis-(4-hydroxyphenyl)-ethane; 1,2-bis-(4-hydroxyphenyl)-ethane; 1,1-bis-(4-hydroxy-2-chlorophenyl)-ethane; 1,1-bis-(2,5-dimethyl-4-hydroxyphenyl)-ethane; 1,3-bis-(3-methyl-4-hydroxy-phenyl)propane; 2,2-bis-(3-phenyl-4-hydroxyphenyl)-propane; 2,2-bis-(3-isopropyl-4-hydroxyphenyl)-propane; 2,2-bis-(4-hydroxynaphthyl)-propane; 2,2-bis-(4-hydroxyphenyl)-pentane; 3,3-bis-(4-hydroxyphenyl)-pentane; 2,2-bis-(4-hydroxyphenyl)-heptane; bis-(4-hydroxy-phenyl)-phenyl methane; bis-(4-hydroxy-phenyl)-cyclohexyl methane; 1,2-bis-(4-hydroxy-phenyl)-1,3-bis(phenyl)ethane; 2,2-bis-(4-hydroxy-phenyl)-1,3-bis-(phenyl) propane; 2,2-bis(4-hydroxy-phenyl)-1-phenyl propane; and the like.

Illustrative examples of silane materials that can be used as one of the reactants for causing the formation of the copolymer include, for example, methyloctyldichloro silane, dimethyl dichlorosilane, methyl phenyl dichlorosilane, diphenyldichlorosilane and the like. Virtually any type of silane material can be used that results in copolymers embraced within the above formula, the type of silane used, or combinations thereof, depending on the polymer properties desired.

Illustrative examples of specific adhesive silicone copolymer materials that may be used in the generating layer include dimethylsiloxy coupled bisphenol A, methyloctylsiloxy coupled bisphenol A, methylphenyl siloxy bisphenol A, dimethyl siloxy coupled 2,4'-dihydroxydiphenyl-methane, dimethyl siloxy coupled bis-(2-hydroxy phenyl) methane, dimethyl siloxy coupled 1,2-bis-(4-hydroxy phenyl)-ethane, methyl octyl siloxy coupled bis-(2-hydroxy phenyl)-methane, methyloctyl siloxy coupled 2,4' dihydroxy diphenyl methane, methyl octyl siloxy coupled bis(4-hydroxy phenyl)-methane, methoctyl-siloxy coupled 1,1-bis-(4-hydroxy phenyl) ethane, methyloctyl siloxy coupled 1,3-bis-(4-hydroxyphenyl)-ethane, methyloctyl siloxy coupled, 2,2-bis-(3-phenyl-4-hydroxy phenyl) propane, methyloctyl siloxy coupled 2,2-bis-(4-hydroxy phenyl) pentane and the like.

One of the preferred silicone copolymers of the present invention is of the formula

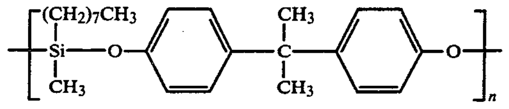

wherein n is a number from 5 to about 1,000.

The dispersed pigment used as the generating material can be any one of numerous pigments including for example metal phthalocyanines and metal free phthalocyanines such as X metal free phthalocyanine, alpha metal free phthalocyanine, beta metal free phthalocyanine, vanadyl phthalocyanine, copper phthalocyanine, selenium pigments such as amorphous selenium, trigonal selenium, as well as selenium alloys such as selenium-tellurium, selenium-bisminth, arsenic triselenide ($As_2Se_3$) and the like. The ratio of pigment to silicone copolymer is from about 1:10 to about 2:1 and preferably from 1:5 to about 1:1. It is important to note that the pigment is present as a dispersion in the silicone copolymer material. The generating layer, including the pigment dispersed therein can range in thickness from about 1 to about 7 microns and preferably from 1 to about 3 microns.

It is of course to be understood that these listings are intended for illustrative purposes only and by no means is it desired to be restricted to such materials as other equivalent or similar materials can be employed providing they perform the functions indicated and do not adversely substantially affect the system.

In one specific embodiment generally the silicone copolymer material can be prepared by reacting the appropriate silane with a suitable biphenol such as bisphenol A in a flask under agitation. In one preferred method of preparation, a biphenol such as bisphenol A is heated in a Morton flask under agitation at a temperature of about 25° C. with suitable solvents such as benzene and pyridine, until the bisphenol A has been dissolved. Subsequently the appropriate silane such as dichlorosilane is added to the dissolved mixture over a period of about 1–2 hours, and at a temperature of from about 40° to about 60° C. This reaction mixture is then heated to a gentle reflux and subsequently cooled to room temperature. Thereafter the pyridine hydrochloride is removed by filtration and the solution is washed off contaminants and the polymer isolated by vacuum evaporation of the solvent. The polymer can then be heated at elevated temperatures for a period of about 20 hours in a vacuum in order to complete the condensation reaction.

The imaging member in which the generating layer of the present invention can be employed in one embodiment is comprised of a substrate, a hole injecting electrode material in contact with the substrate, a charge transport layer comprised of an electrically inactive organic resin having dispersed therein an electrically active material, the combination of which is substantially nonabsorbing to visible electromagnetic radiation but allows the injection of photo-generated holes from a charge generator layer in contact with the hole transport layer, and electrically induces holes from the layer of injection materials, and a layer of insulating organic resin overlaying the layer of charge generating material which is adhered between the transport layer and the overcoated layer. This layered structure can readily be formed by first applying the hole injecting electrode layer to the supporting base in fluid form, evaporating the solvent or liquid carrier to solidify the hole injecting electrode layer; followed by applications of the charge carrier layer to the hole injecting electrode layer in fluid form and evaporating off the liquid carrier of this coating. The charge carrier layer is then overcoated with the photogenerating layer of the present invention and finally an electrically insulating overcoating layer.

The various layers are fully described in copending applications U.S. Ser. Nos. 881,262 and 905,250 totally incorporated herein by reference. However, illustrative examples of these layers will be described in the present application for convenience.

The substrate can be opaque or substantially transparent and may comprise non-conducting materials such as inorganic or organic polymeric materials; or a layer of an organic or inorganic material having a conductive surface layer arranged thereon, or a conductive material such as aluminum, brass or the like. The substrate is generally flexible, however, it may also be rigid and can assume many different configurations such as a plate, a cylindrical drum, an endless belt, and the like. The thickness of the substrate layer can be over 100 mils, but is preferably from about 3 to 10 mils. The hole injecting electrode layer coated over the substrate can include many materials which are capable of injecting charge carriers under the influence of an electrical field that include for example gold, graphite, and preferably carbon black or graphite dispersed in various polymer resins, this electrode being prepared by solution casting of a mixture of carbon black or graphite dispersed in an adhesive polymer solution onto a support substrate such as Mylar or aluminized Mylar. Illustrative examples of polymers that can be used as the material within which the carbon black or graphite is dispersed include polyesters such as PE-100 commercially available from Goodyear Company, as well as those polyester materials that are polymeric esterification products of a dicarboxylic acid and a diol comprising a diphenol such as 2,2-bis(4 beta hydroxy ethoxy phenyl) propane, 2,2-bis(4-hydroxy isoepoxyphenyl) propane, 2,2-bis(4-beta hydroxy ethoxy phenyl) pentane and the like while a typical dicarboxylic acids include oxalic acid, malonic acid, succinic acid, phthalic acid, terephthalic acid, and the like. The ratio of polymer to carbon black or graphite ranges from about 0.5:1 to 2:1 with the preferred range of about 6:5. The hole injecting layer has a thickness in the range of from about 1 to about 20 microns or preferably from about 4 to about 10 microns.

The charge carrier transport layer which is overcoated on the hole injecting material can be any number of numerous suitable materials which are capable of transporting holes, this layer generally having a thickness in the range of from about 5 to about 50 microns and preferably from about 20 to about 40 microns. This transport layer comprises molecules of the formula:

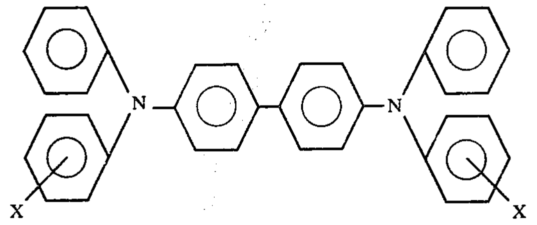

dispersed in a highly insulating and transparent organic resinous material wherein X is selected from the group consisting of (ortho) $CH_3$, (meta) $CH_3$, (para) $CH_3$, (ortho) Cl, (meta) Cl, (para) Cl. This charge transport layer which is described in detail in copending application Ser. No. 716,403 (series of 1970) filed by Milan Stolka, et al., on Aug. 23, 1976, and totally incorporated herein by reference, is substantially non-absorbing in the spectral region of intended use, i.e., visible light, but is "active" in that it allows injection of photogenerated holes from the charge generator layer and electrically induced holes from the injecting interface. The highly insulating resin, which has a resistivity of at least $10^{12}$ ohm-cm to prevent undue dark decay, is a material which is not necessarily capable of supporting the injection of holes from the injecting or generator layer and is not capable of allowing the transport of these holes through the material. However, the resin becomes electrically active when it contains from about 10 to 75 weight percent of the substituted N,N,N',N'-tetraphenyl-[1,1'-biphenyl]4-4'-diamines corresponding to the foregoing formula. Compounds corresponding to this formula include, for example, N,N'-diphenyl-N,N'-bis-(alkylphenyl)-[1,1-biphenyl]-4,4'-diamine wherein the alkyl is selected from the group consisting of methyl such as 2-methyl, 3-methyl and 4-methyl, ethyl, propyl, butyl, hexyl and the like. In the case of chloro substitution, the compound is named N,N'-diphenyl-N,N'-bis (halo phenyl)-[1,1'-biphenyl]-4,4'-diamine wherein the halo atom is 2-chloro, 2-chloro or 4-chloro.

Other electrically active small molecules which can be dispersed in the electrically inactive resin to form a layer which will transport holes include triphenylmethane, bis-(4-diethylamino-2-methylphenyl)phenylmethane; 4',4''-bis(diethylamino)-2'2''-dimethyltriphenyl methane; bis-4(-diethylamino phenyl)phenylmethane; and 4,4'-bis(diethylamino)-2,2'-dimethyltriphenylmethane.

The transport layer may comprise any transparent electrically inactive binder resinous material such as those described by Middleton, et al., in U.S. Pat. No. 3,121,006, incorporated herein by reference. The resinous binder contains from 10 to 75 weight percent of the active material corresponding to the foregoing formula and preferably from about 40 to about 50 weight percent of this material. Typical organic resinous materials useful as the binder include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binder materials are polycarbonate resins having a molecular weight ($M_w$) of from about 20,000 to about 100,000 with a molecular weight in the range of from about 50,000 to about 100,000 being particularly preferred.

The electrically insulating overcoating layer typically has a bulk resistivity of from about $10^{12}$ to about $5\times10^{14}$ ohm-cm and typically is from about 5 to about 25 microns in thickness. Generally, this layer provides a protective function in that the charge carrier generating layer is kept from being contacted by toner and ozone which is generated during the imaging cycles. The overcoating layer also must prevent charges from penetrating through it into charge carrier generating layer or from being injected into it by the latter. Preferably, therefore insulating overcoating layer comprises materials having higher bulk resistivities. Generally, the minimum thickness of the layer in any instance is determined by the functions the layer must provide whereas the maximum thickness is determined by mechanical considerations and the resolution capability desired for the photoreceptor. Typical suitable materials include Mylar (a polyethylene terephthalate film available from E. I. duPont de Nemours), polyethylenes, polycarbonates, polystyrenes, polyesters, polyurethanes and the like.

In one preferred imaging sequence the overcoated photoreceptor comprising the layers described hereinbefore is electrically charged negatively a first time in the absence of illumination, the negative charges residing on the surface of the electrically insulating overcoating layer. In view of this, an electric field is established across the photoreceptor and as a result of this field holes are injected from the charge carrier injecting electrode layer into the charge carrier transport layer which holes are transported through the layer and enter into the charge carrier generating layer. These holes travel through the generating layer until they reach the interface between the charge carrier generator layer and the electrically insulating overcoating layer where such charges become trapped and as a result of this trapping at the interface there is established an electrical field across the electrically insulating overcoating layer. Generally this charging step is accomplished with a voltage in the range of from about 10 volts/microns to about 100 volts/microns.

Subsequently, the photoreceptor member is charged a second time in the absence of illumination but with a polarity opposite to that used in the first charging step thereby substantially neutralizing the charges residing on the surface. After the second charging step with a positive polarity the surface is substantially free of electrical charges, that is the voltage across the photoreceptor member upon illumination of the photoreceptor may be brought to substantially zero. As a result of the second charging step, positive charges reside at the interface between the generating layer and the overcoating layer and further there is a uniform layer of negative charges located at the interface between the hole injecting layer and the transport layer.

Thereafter, the photoreceptor member can be exposed to an imagewise pattern of electromagnetic radiation to which the charge carrier generating material namely the pigment dispersed in the silicone polymer of the present invention, is responsive and as a result of such imagewise exposure an electrostatic latent image is formed on the photoreceptor. The electrostatic image formed may then be developed by conventional means resulting in a visible image such development being accomplished by for example, cascade, magnetic brush, liquid development, and the like. The visible image is typically transferred to a receiver member by any conventional transfer technique and permanently affixed thereto.

In a preferred embodiment of the present invention, the support material is Mylar, the hole injecting electrode is carbon black dispersed in a polyester polymer, the transport layer is N,N'-diphenyl-N,N'-bis(3-methylphenyl)-[1,1'-biphenyl]4-4' diamine dispersed in a polymer matrix, the generating layer is X metal free phthalocyanine or vanadyl phthalocyanine dispersed in a methyloctyl siloxane bisphenol A copolymer, and the overcoating layer is a Mylar film.

The invention will now be described in detail with respect to specific preferred embodiments thereof, it being understood that these examples are intended to be illustrative only and the invention is not intended to be limited to the materials, conditions, process parameters and the like recited herein. All parts and percentages are by weight unless otherwise indicated.

EXAMPLE I

There was prepared a methyloctylsiloxane bis-phenol A copolymer by the following method. Into a 250 ml. 3-necked Morton flask equipped with a mechanical stirrer, refluxing condenser, dropping funnel, thermometer and heating mantle there was added 11.4 grams (0.05 moles) of bisphenol A, 20 grams of dry benzene and 10 grams of dry pyridine. The reaction mixture was stirred at room temperature until the bisphenol A dissolved and subsequently 11.89 grams (0.052 moles) of methyloctyldichlorsilane was added dropwise into the flask over a period of about 1.5 hours and at a temperature of 45° to 55° C. This reaction mixture was then heated to a gentle reflux for 1 hour, subsequently cooled to room temperature followed by the addition of more benzene. The solid pyridine hydrochloride was removed by filtration. The remaining filtrate was washed twice with a 2 percent solution of HCl, and 2 percent of sodium bicarbonate, and distilled water to a neutral pH and dried over sodium sulfate. The material was then subjected to vacuum evaporation of the purpose of removing any remaining solvent and the residue was heated at 100° C. for 20 hours in a vacuum.

The resulting material which functions as a generating layer was then fabricated into an overcoated photoreceptor containing a substrate, a hole injecting layer comprised of carbon black dispersed in a polymer overcoated with a transport layer and the generating layer comprised of the silicone polymer 1.5 grams and 0.3 grams of X metal free phthalocyanine and finally an insulating overcoating layer, ½ mil thick Mylar applied by thermal lamination.

The resulting overcoated photoreceptor had excellent mechanical properties, that is excellent flexibility, superior adhesion between the layers particularly between the transport and overcoating layer.

The electrical characteristics of the photoreceptor were also investigated and the results indicated that holes travel across the interface between the transport layer and the generation layer in both directions. The photoreceptor was charged a first time with a potential of −900 volts and then charged a second time with a potential of +1800 volts. The photoreceptor was subsequently uniformly illuminated with white light. Electrical measurements indicated that the field across the photoreceptor was discharged to substantially zero potential thus showing that the photoreceptor is suitable for use according to the method of the present invention.

A reproduction was made with a Xerox Model D processor employing the photoreceptor described above and a high quality image of excellent resolution was obtained.

EXAMPLE II

The procedure of Example I was repeated with the exception that in place of the methyl octyl siloxane bisphenol A copolymer there was used a material comprised of 50 percent of methyl octyl siloxane bisphenol A and 50 percent of dimethyl siloxane bisphenol A terpolymer. Substantially similar results were obtained, that is the resulting overcoated photoreceptor had excellent mechanical properties, that is excellent flexibility, superior adhesion between the layers particularly between the transport and overcoating layers and when used in an imaging system such a photoreceptor produced high quality images of excellent resolution.

EXAMPLE III

The method of Example I was repeated with the exception that in the place of the X metal free phthalocyanine which is used as a pigment in the generating layer there was substituted vanadyl phthalocyanine. Substantially similar results were obtained, that is the resulting overcoated photoreceptor had excellent mechanical properties including excellent flexibility, superior adhesion between the layers particularly between the transport and overcoating layers and when used in an imaging system high quality images of excellent resolution were obtained.

EXAMPLE IV

The process of Example I is repeated with the exception that trigonal selenium is substituted for the X metal free phthalocyanine which is used as a pigment in the generating layer and substantially identical results were obtained, that is the resulting overcoated photoreceptor has excellent mechanical properties including excellent flexibility, superior adhesion between the layers particularly the transport and overcoating layers and when used in an imaging system, high quality images of excellent resolution were produced.

EXAMPLE V

A four inch by four inch sample of the photoreceptor as prepared in Examples I, II and III was used to produce xerographic reproductions with a Xerox Model D processor and a good quality reproduction was obtained.

EXAMPLE VI

The procedure of Example I was repeated and the resulting copolymer produced which functions as a generating layer was fabricated into an overcoated photoreceptor. This photoreceptor was prepared by coating a mixture of 6 percent PE-100, a polyester commercially available from Goodyear Chemicals, and 5 percent carbon black-Monarch 1300 commercially available from Cabot Corporation (in chloroform and ball milled for 17 hours) on a plain Mylar substrate having a thickness of approximately 125 microns using a Garder mechanical drive film coating apparatus equipped with a 1.5 mil gap film applicator. The uniformly coated film was dried in a vacuum oven at about 60° C. for 2–3 hours. The dried film was then overcoated with a hole transport layer comprised of a 1:1 ratio of N,N'diphenyl-N,N-bis(3-methylphenyl)-[1,1'-biphenyl]-4,4' diamine and Makrolon polycarbonate commercially available from Mobay Chemical Company and the entire structure was dried in a vacuum oven. A generating layer comprised of the silicon copolymer 1.5 grams, 0.3 grams of X metal free phthalocyanine was applied as an overcoat to the transport layer and finally an insulating overcoating layer ½ mil thick Mylar was laminated over the generating layer. This photoreceptor was charged a first time with a potential of −900 volts and then charged a second time with a potential of +1800 volts and subsequently the photoreceptor was then uniformly illuminated with white light. Electrical measurements show that the field across the photoreceptor was discharged to substantially zero potential, thus indicating that the photoreceptor was suitable for use according to the present invention. Also, electrical measurements showed that the holes travel across the interface between the transport layer and the generator layer in both directions.

Although the invention has been described with respect to specific preferred embodiments, it is not intended to be limited thereto, but rather those skilled in the art will recognize that variations and modifications may be made therein which are within the spirit of the invention and the scope of the claims.

What is claimed is:

1. An adhesive generating layer for use in an overcoated photoreceptor system, this layer being comprised of a generating pigment dispersed in a copolymer of a siloxane and a dihydroxy compound of the formula:

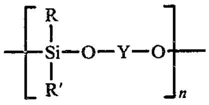

wherein R and R' are independently selected from the group consisting of alkyl, substituted alkyl, alkenes, substituted alkenes, aryl and substituted aryl; Y is a dihydroxy radical; and n is a number of sufficient value that the average molecular weight of the resulting silicone copolymer is between about 2,000 and 250,000.

2. An adhesive generating layer in accordance with claim 1 wherein R and R' are alkyl radicals of from 1 to 20 carbon atoms.

3. An adhesive generating layer in accordance with claim 2 wherein the alkyl radicals are methyl.

4. An adhesive generating layer in accordance with claim 1 wherein the alkene radicals contain from 2 to 24 carbon atoms.

5. An adhesive generating layer in accordance with claim 1 wherein the aryl radicals contain from 6 to 20 carbon atoms.

6. An adhesive generating layer in accordance with claim 5 wherein the aryl radical is phenyl.

7. An adhesive generating layer in accordance with claim 1 wherein the dihydroxy radical Y is ethylene glycol or a biphenol.

8. An adhesive generating layer in accordance with claim 7 wherein the biphenol is 2,2-bis-(4-hydroxy phenyl)-propane.

9. An adhesive generating layer in accordance with claim 1 wherein n is a number of from 5 to about 1,000.

10. An adhesive generating layer in accordance with claim 1 wherein the silicon copolymer is methyl octyl siloxane 2,2-bis-(4-hydroxy phenyl)-propane.

11. An adhesive generating layer in accordance with claim 1 wherein the generating pigment is a metal phthalocyanine, a metal free phthalocyanine, selenium or a selenium containing compound.

12. An adhesive generating layer in accordance with claim 11 wherein the generating pigment is X metal free phthalocyanine.

13. An adhesive generating layer in accordance with claim 11 wherein the generating pigment is vanadyl phthalocyanine.

14. An adhesive generating layer in accordance with claim 11 wherein the generating pigment is amorphous selenium.

15. An adhesive generating layer in accordance with claim 11 wherein the generating pigment is trigonal selenium.

16. An adhesive generating layer in accordance with claim 1 wherein the generating pigment is a selenium alloy.

17. An adhesive generating layer in accordance with claim 1 wherein the silicon copolymer is of the formula:

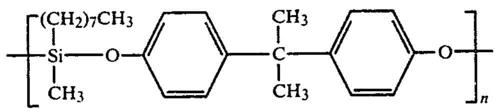

wherein n is a number of from 5 to about 1,000.

18. An adhesive generating layer in accordance with claim 1 wherein the overcoated photoreceptor system comprises an electrically conductive substrate, overcoated with a layer capable of injecting holes into a layer on its surface, this layer being comprised of carbon black or graphite dispersed in a polymer, a hole transport layer in operative contact with the layer of hole injecting material, overcoated with a layer of charge generating material containing a generating pigment dispersed in a copolymer of a siloxane and a dihydroxy compound, this layer being on in an operative contact with the charge transport layer and a top layer of an insulating organic resin overlaying the layer of charge generating material whereby the charge generating material provides that the permanent adhesion of the generating layer to the insulating overcoating layer.

19. An adhesive generating layer in accordance with claim 18 wherein the substrate is polyethylene terephthalate, the electrically active material dispersed in the insulating organic resin is a nitrogen containing compound of the formula:

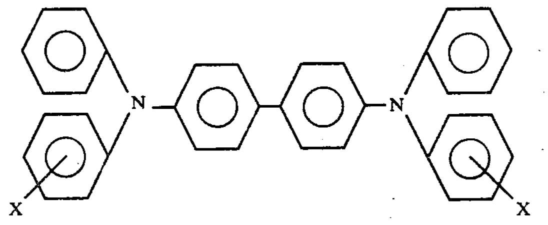

the transport layer is N,N diphenyl N,N bis 3 methyl 1,1biphenyl 4,4' diamine, the generating material is the silicon copolymer methyl octyl siloxane 2,2-bis(4-hydroxy phenyl)-propane and the overcoating layer is a polyethylene terephthalate film.

* * * * *